July 29, 1958   P. V. RESKO ET AL   2,844,962
COMBINATION REGULATOR AND METER INDEX RING MOUNTING
Filed Aug. 9, 1954   3 Sheets-Sheet 3

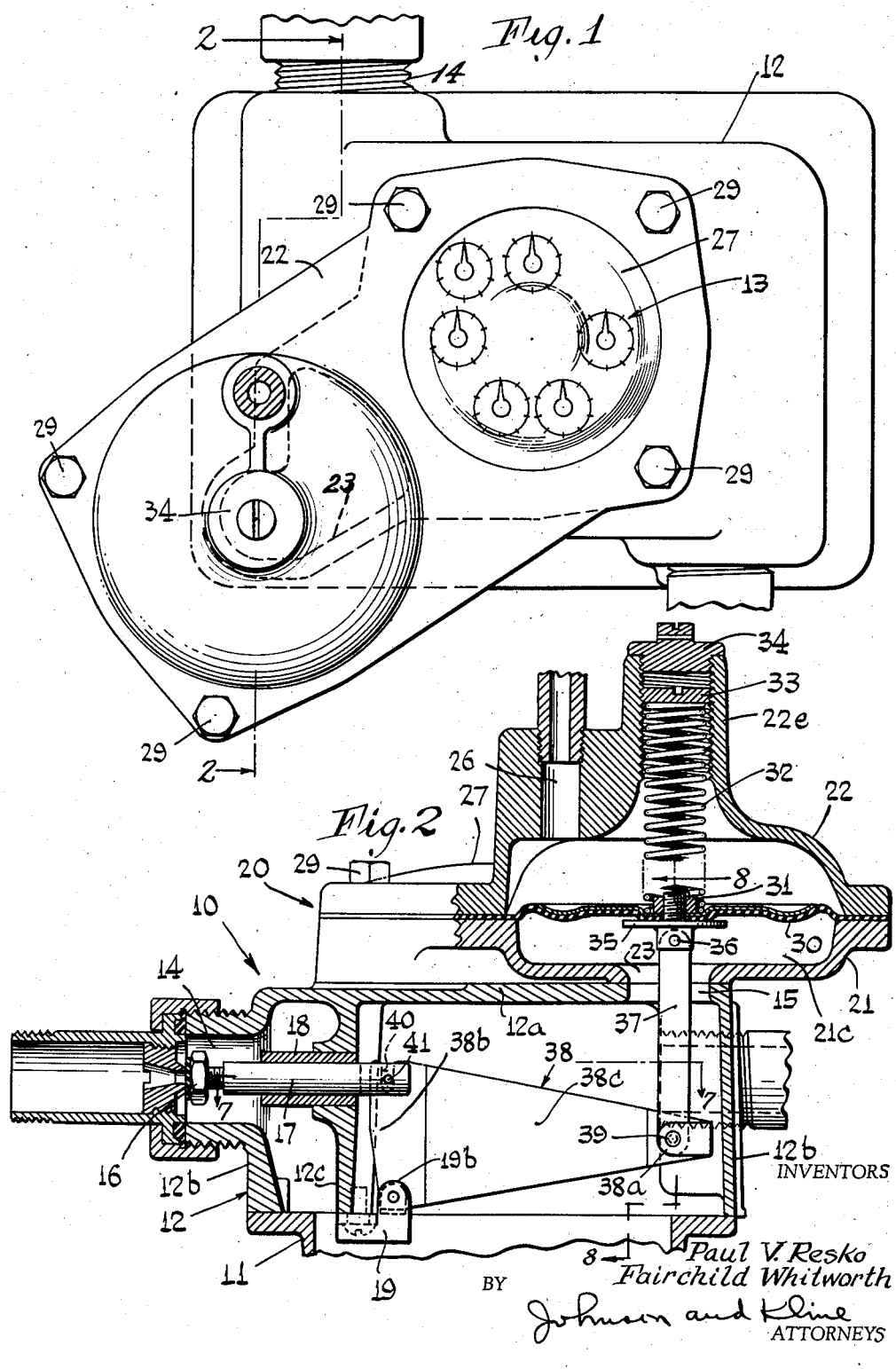

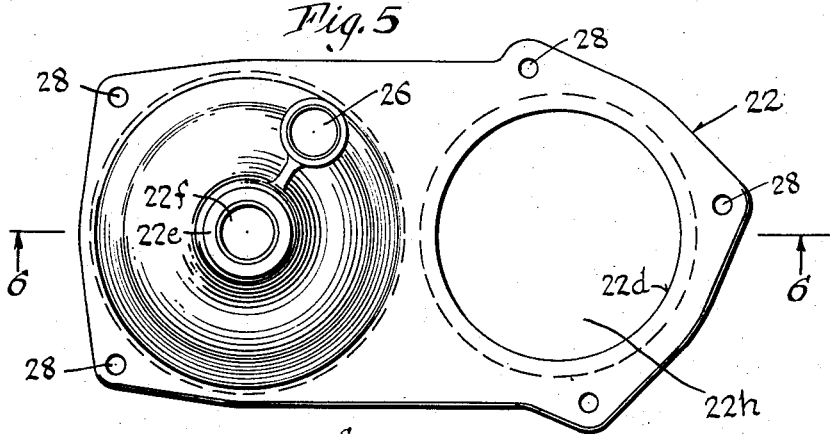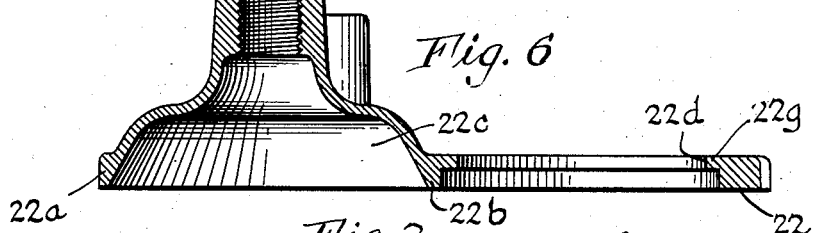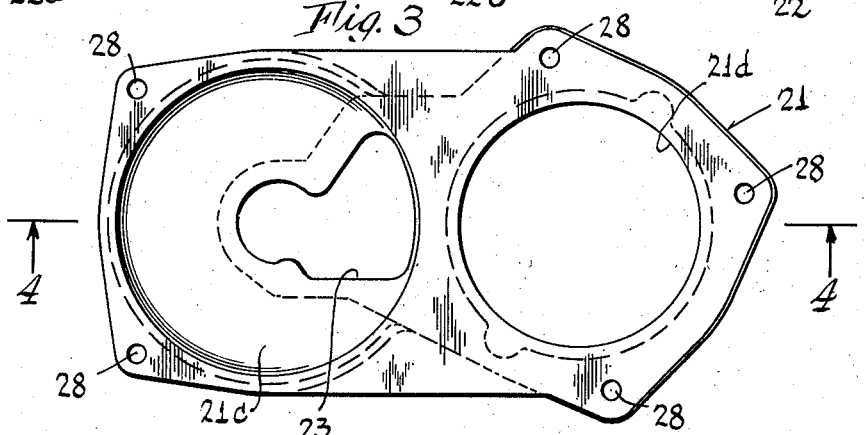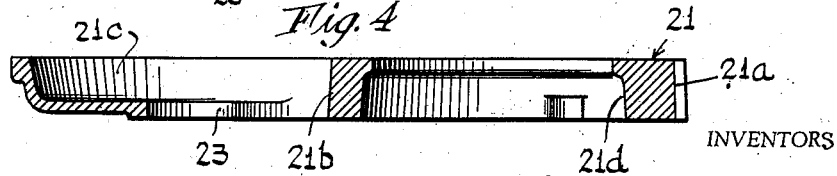

INVENTORS
Paul V. Resko
Fairchild Whitworth
BY Johnson and Kline
ATTORNEYS

United States Patent Office 2,844,962
Patented July 29, 1958

2,844,962

COMBINATION REGULATOR AND METER INDEX RING MOUNTING

Paul V. Resko, Bridgeport, and Fairchild Whitworth, Fairfield, Conn., assignors to The Sprague Meter Company, Bridgeport, Conn., a corporation of Connecticut Application August 9, 1954, Serial No. 448,585

6 Claims. (Cl. 73—199)

This invention relates to curb type gas meters and in particular to a novel arrangement of parts forming a combination regulator and meter construction including a cover for housing an index register mechanism and a pressure regulator juxtaposed thereto and forming a compact unitary device.

Heretofore it was customary to install a pressure regulator on the back of the meter. But the problem arising in conjunction with the use of curb meters was the restricted space in the curb box which prevented the use of a pressure regulator mounted in its usual position on the rear of the meter. Therefore, the practice developed in the installation of curb meter systems of locating a separate pressure regulator unit in the line leading to the meter.

This system possessed certain disadvantages in that it required a larger curb box or a plurality of boxes to receive the meter casing, separate pressure regulator and the additional piping which increased the cost of installation and required additional maintenance.

An object of the invention is to overcome these disadvantages and provide a combination meter and regulator adapted to fit in a curb box of substantially smaller size than was heretofore possible. This is accomplished by incorporating a pressure regulator in juxtaposed relationship to the register-enclosing cover on a meter top, thereby forming a compact unit that may be produced independently of the meter casing proper and readily attached or detached to the existing or standard type curb meter casings.

Another object of this invention is to provide a meter top having a valve controlled inlet in which the valve is operatively connected by a novel linkage mechanism with the regulator for insuring a positive opening and closing of said valve in response to the movement of a regulator actuating means.

A feature of this invention resides in the relatively simple and inexpensive construction wherein pressure regulator structure is combined with the register-enclosing cover for a meter top.

Another feature of this invention is the provision of a combined curb meter top construction which facilitates manufacture, assembly, shipping, repair or replacement of a meter top to a meter casing.

A further feature of this invention is having a pressure controlling valve for the inlet port controlled by a pressure responsive device supported in offset relation on the upper surface of the meter top.

A still further feature of this invention resides in the provision of a simplified linkage mechanism for connecting the control valve to an offset pressure responsive diaphragm to secure accurate and reliable control thereof.

The feature of construction provided by the present invention makes it possible to use simple castings having few machined surfaces to provide a relatively simple and inexpensive housing for an index register mechanism and a pressure regulator juxtapositioned thereto.

Other features and advantages will hereinafter appear.

In the accompanying drawings:

Figure 1 is a plan view of the meter box top showing the pressure regulator in juxtaposition to an index register.

Fig. 2 is a sectional view taken along line 2—2 of Fig. 1.

Fig. 3 is a detailed plan view of the lower frame member.

Fig. 4 is a detailed sectional side view of the lower frame member taken along line 4—4 of Fig. 3.

Fig. 5 is a detailed plan view of the upper frame member.

Fig. 6 is a detailed sectional side view of the upper frame member taken along line 6—6 of Fig. 5.

Figure 7:
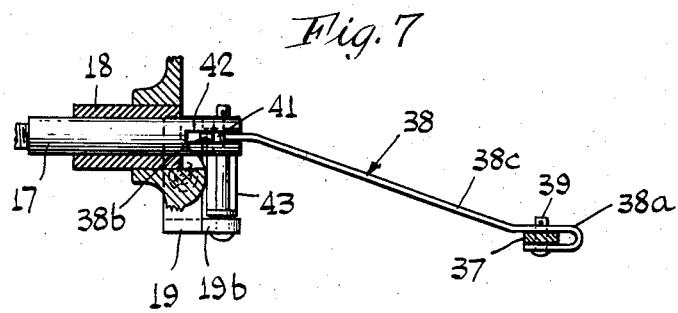
Fig. 7 is a sectional view of the bellcrank lever connecting the valve stem to the pressure regulator plunger taken along line 7—7 of Fig. 2.

In accordance with the present invention a compact combined curb meter and regulator is provided which can be installed in the usual curb box of the size to receive the usual curb meter alone and thus eliminate the use of additional or large boxes to receive and accommodate the meter and a separate regulator and the necessary piping therefor.

In a preferred form of the invention a meter top 10 is adapted to be mounted on the usual curb type gas meter casing 11 having suitable metering mechanism therein (not shown) and includes a main body 12 preferably in the form of a casting having a top supporting surface 12a for supporting an index registering mechanism 13 and side walls 12b depending from the said supporting surface. The wall portion 12b is provided with an inlet port 14 which is adapted to be connected to a source of gas supply. The top has an opening 15 formed in the top supporting surface 12a and underlying the opening 23 shown in Fig. 1, the axis of opening 15 being offset from the axis of inlet port 14. Provided in the top is a partition wall or web 12c extending adjacent the inlet port 14 to carry a valve 16 cooperating with the port 14 to control the flow of gas therethrough, the valve being adjustably carried by a stem 17 slidable in a bearing sleeve 18 mounted in the wall 12c in a plane including the axis of the inlet port. A bracket 19, Figs. 8 and 9, having a pair of spaced ears 19a and 19b is secured to the bottom of the partition wall or web 12c to provide a pivotal support for a lever or bellcrank means to be subsequently described.

Overlying the registering mechanism and supported on the main body is a combined register enclosing cover and juxtaposed pressure regulator housing shown at 20 and comprises a pair of superimposed frame members 21 and 22. The lower frame member 21, Figs. 3 and 4, is formed preferably of a cast material which has an enclosing wall 21a and a partition or dividing wall 21b separating the lower frame into a dish-like pressure chamber 21c and a register enclosing well or portion 21d for enclosing the index mechanism. The dish-shaped pressure chamber has an opening 23 therein of such size and shape which is adapted to be aligned with the opening 15 on the supporting surface 12a of the main body member 12.

The upper frame member 22, Figs. 5 and 6, is likewise preferably formed of a cast material which is adapted to overlie and be secured to the lower frame member 21, said upper frame member having a surrounding wall portion 22a and a partition or dividing wall 22b which separates the upper frame member into a vent chamber portion 22c and a register cover portion 22d, the vent chamber portion being dome-shaped. Said dome has an extension 22e at the apex having a threaded opening 22f therein. Adjacent the top of the dome-shaped vent chamber is a vent opening 26 communicating the interior of the vent chamber to the atmosphere. However, it will be understood that the position of the vent opening is not critical and may be located elsewhere in the dome. The register portion of the upper frame member has an opening 22h with a radially inwardly-extending continuous flange 22g around its periphery and preferably cast integral therewith.

Both upper and lower frames have a plurality of openings 28 around its peripheral wall portion adapted to be aligned so that the frame members may be fastened together in superimposed relationship and to the main body. Bolts or screws 29 may be used for the fasteners. It will be noted that the surrounding walls of the lower frame member are somewhat thicker than the surrounding walls of the upper frame member. The difference in thickness provides for a better seating and sealing arrangement between the upper frame member and lower frame member when fastened together.

Disposed between the frame members which is adapted to overlie the registering mechanism is a transparent panel 27 which forms a closure for the said registering mechanism which protects the same and facilitates the viewing thereof. This panel is supported on the top of the enclosing wall of the lower frame member and is secured or locked in place by the continuous inwardly-extending flange of the upper frame index portion when the latter is fastened to the lower frame member to form the meter register cover.

Disposed between the upper and lower frame members on the register side is a flexible diaphragm 30 which forms an imperforate wall portion which separates the pressure chamber from the vent chamber. Secured to the vent side of the diaphragm by means of a lever yoke cap 31 is a regulator adjustment spring 32 which has the other end thereof extending up through the dome extension 22e. An adjusting cap 33 engages the end of the spring in the dome extension. The purpose of the adjusting cap is to adjust the spring so that a desired load is placed on the diaphragm. For protection, and to prevent tampering of the adjusting cap and spring is a plug 34 which closes the top of the dome extension after the adjustment has been set. It should be noted that by locating the regulator on the top it is readily accessible for adjustment, repair, or removal without a great deal of work and time consuming labor. Connected to the opposite or the pressure side of the diaphragm is a lever yoke plate 35 to which is pivoted at 36 a regulator plunger 37.

It will be noted that the combined meter cover and pressure regulator may be formed as a unit which is adapted to seat on the main body. The opening 23 of the pressure chamber 21c is aligned with the opening 15 in the top surface 12a of the body member 12 so that the regulator plunger extends through the said aligned openings.

As it was previously stated, the axis of the aligned openings lies in a plane parallel or transversely out of alignment with the plane containing the axis of the inlet port 14. Thus, by this arrangement it will be noted in Figures 1 and 2 that the regulator plunger is disposed at its most distant point possible opposite the valve, while at the same time being free from interference with the index structure so that the perpendicular distance between the valve and plunger is maximum for accommodating the longest possible lever arm. The purpose of this arrangement is to provide for a sufficient leverage arm linkage between the regulator plunger and the valve for insuring positive lock-up of the valve in response to a pressure variation within the meter without changing the proportions of the meter top, so that the said new and novel top may be adapted for use on a standard meter casing.

Because of this offset relationship between the valve and pressure regulator a novel bellcrank 38 is provided for. This bellcrank is preferably constructed of sheet metal having a substantially triangular configuration. The apex portion 38a of the bellcrank is pivotally connected to the regulator plunger at 39. The base portion 38b has one end pivoted on the bracket 19 and the other end connected to the valve stem, said pivoted end lying in the plane containing the axis of the inlet port. It will be noted in Figs. 7 and 8 that the apex portion of the bellcrank lies substantially in the plane containing the axis of the regulator plunger and that the base member is parallel or offset therefrom. An intermediate offset portion 38c connects the apex of the bellcrank to its base. The triangular configuration and the lateral offset intermediate portion of the bellcrank provides the lever with greater rigidity and more strength.

The bellcrank is connected to the valve stem by means of a slot 40 and pin 41 connection. The end of the valve stem is split at 42 so that the slot 40 of the base portion of the bellcrank may be positioned therebetween. Extending transversely of the split end of the valve stem is a pin 41 which is adapted to engage the edge of the slot 40 in the bellcrank base portion.

It should be noted further than the base pivoted to the bracket and connected to the valve stem lies in a common plane. This permits a more positive action of the valve. A U-shaped spacer 43 (shown in Fig. 8) is provided to prevent lateral movement of the base portion of the bellcrank about the pivot. If desired, the spacer 43 may be made integral with the base portion of the bellcrank, as shown.

Figure 8:
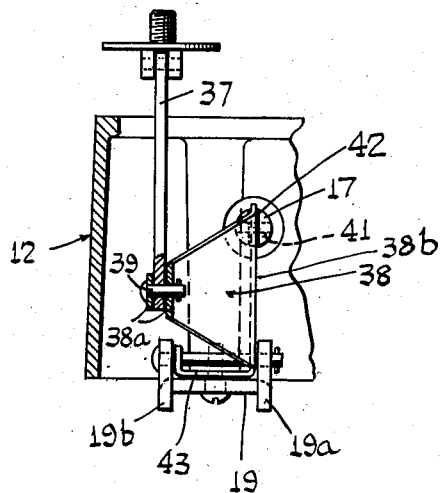
Fig. 8 is a sectional view of the bellcrank operator taken along line 8—8 of Fig. 2.

By this novel arrangement, as will be seen by a study of Figs. 2, 7 and 8, the variations in pressure which cause a flexing of the diaphragm will occasion the regulator plunger to move with a reciprocating motion. This movement of the plunger will cause the apex and base portion of the bellcrank to rotate about the pivot on bracket 19. Rotating of the base about the pivot will cause the slot 40 to push against the pin 41 on the valve stem, thereby giving horizontal longitudinal movement to the valve and valve stem. Because of the intermediate offset of the bellcrank, the motion transmitted to the apex lying in the plane of the regulator plunger is transmitted to the base portion parallel thereto permitting the base to rotate in a plane containing the axis of the inlet port and the valve, thus permitting the valve to operate in a smooth, easy positive manner in a plane containing the axis of the inlet port. In this arrangement sufficient leverage is obtained whereby the slightest response of the diaphragm will cause a corresponding displacement of the valve thereby controlling the amount of gas entering the meter.

It will be noted that the new novel arrangement herein described provides for a compact meter top having combined register-enclosing cover and a juxtaposed pressure regulator which is made of relatively simple and inexpensive construction. The meter top proportions are maintained so that it can be adapted to the standard meter casing and yet provides for a sufficient lever arm between the regulator and valve to permit positive lock-up of the valve. In the described arrangement the separate line regulator and its connecting pipe segments, necessary previous to this novel device, are eliminated, thereby materially reducing the cost of installation and maintenance. Also the compactness and novel arrangement described further reduces the cost by facilitating the manufacture, assembly, shipping, handling, repairing, or replacement of the same.

Variations and modifications may be made within the scope of the claims and portions of the improvements may be used without others.

We claim:

1. In a curb meter, a combined register cover and juxtaposed pressure regulator housing adapted to be mounted on the top of the meter, comprising a lower frame member having a surrounding wall portion and a partition wall, said walls forming a pressure chamber portion for the regulator and a housing adapted to surround a register means, an upper frame member having a surrounding wall and a partition wall adapted to be aligned with and supported on the walls of said lower frame and forming a vent chamber portion for the regulator and a viewing opening adapted to overlie a register means, a transparent panel disposed in said opening and adapted to overlie a register to protect and facilitate reading of the same, and fastening means for securing said frames in leak-tight arrangement.

2. In a gas meter, a combined register cover and juxtaposed pressure regulator adapted to be mounted on the exterior of the meter, comprising a lower frame member having an opening therethrough providing a wall portion adapted to surround a register means and an upwardly facing dished portion having an aperture therein and forming a pressure chamber portion for the regulator, an upper frame member having an aperture having panel-receiving means adapted to be aligned with the opening in the lower frame and a dome-shaped, downwardly facing portion adapted to be aligned with said pressure chamber portion and forming a vent chamber portion for the regulator, a transparent panel mounted in the panel-receiving means and adapted to overlie said register means to protect and facilitate reading of the same, and fastening means for securing said frames in leak-tight arrangement.

3. The invention as defined in claim 2 wherein said frame members comprise simple metal castings substantially free of machined surfaces.

4. In a gas meter, a combined register cover and juxtaposed pressure regulator adapted to be mounted on the exterior of the meter, comprising a lower frame member having an opening therethrough providing a wall portion adapted to surround a register means and an upwardly facing dished portion having an aperture therein and forming a pressure chamber portion for the regulator, an upper frame member having an aperture having panel-receiving means adapted to be aligned with the opening in the lower frame and a dome-shaped, downwardly facing portion adapted to be aligned with said pressure chamber portion and forming a vent chamber portion for the regulator, a transparent panel mounted in the panel-receiving means and adapted to overlie said register means to protect and facilitate reading of the same, a diaphragm disposed between the frame members to extend across the regulator portion of the frame separating the pressure chamber and vent chamber, said upper frame having an opening for venting said vent chamber portion, and fastening means for securing said frames together and the diaphragm in position in leak-tight arrangement.

5. In a gas meter, a combined register cover and juxtaposed pressure regulator adapted to be mounted on the exterior of the meter, comprising a lower frame member having an opening therethrough providing a wall portion adapted to surround a register means and an upwardly facing dished portion forming a pressure chamber portion for the regulator, said dished portion having an aperture in the bottom thereof, an upper frame member having an aperture having panel-receiving means adapted to be aligned with the opening in the lower frame and a dome-shaped, downwardly facing portion adapted to be aligned with said pressure chamber portion and forming a vent chamber portion for the regulator, said upper frame having an opening for venting said vent chamber portion, a transparent panel mounted in the panel-receiving means and adapted to overlie said register means to protect and facilitate reading of the same, a diaphragm disposed between the frame members to extend across the regulator portion of the frame and separating the pressure chamber and vent chamber, fastening means for securing said frames together and the diaphragm in position in leak-tight arrangement, and operating linkage means connected to the diaphragm and extending through the aperture in the bottom of the pressure chamber.

6. A top for a gas meter having an inlet port, a top reading register and a pressure regulator having a diaphragm therein mounted on said top in offset relation to said inlet and register, said top comprising a body portion including integral enclosing walls having the inlet port for connection to a gas supply and having an integral top wall provided with the top reading register and an offset opening therein communicating with the pressure regulator, the axis of the inlet port lying in a first plane perpendicular to the top wall and parallel to a second plane passing through the center of the offset opening in the top wall, a valve carried by the top and movable axially of the inlet port to control the passage of gas therethrough to the meter, a regulator plunger extending through the offset opening in the top and connected to the diaphragm to be moved thereby, and a sheet metal plate having one end lying in the second plane and connected to the plunger and the other end being offset and lying in said first plane whereby interference therewith by the register is avoided, one edge of the plate adjacent the last-mentioned end being pivoted to the housing and the other edge of the plate adjacent the last-mentioned end being spaced from the first edge and drivingly connected to the valve to provide a lever arm to insure positive movement of the valve in response to pivotal movement of the plate by the diaphragm.

References Cited in the file of this patent

UNITED STATES PATENTS

| | | |
|---|---|---|
| 1,411,228 | Taylor | Mar. 28, 1922 |
| 1,631,472 | Clark | June 7, 1927 |
| 2,274,697 | Hutchinson et al. | Mar. 3, 1942 |
| 2,647,404 | Whitworth | Aug. 4, 1953 |